United States Patent
Paukert et al.

[11] 3,899,242
[45] Aug. 12, 1975

[54] REPRODUCTION LENS SYSTEM

[75] Inventors: Miloslav Paukert; Libuse Schwarzova, both of Prerov, Czechoslovakia

[73] Assignee: Meopta, narodni Podnik, Prerov, Czechoslovakia

[22] Filed: Jan. 21, 1974

[21] Appl. No.: 434,943

[30] Foreign Application Priority Data
Feb. 28, 1973 Czechoslovakia .................. 1431-73

[52] U.S. Cl. .............................................. 350/216
[51] Int. Cl. ............................................. G02b 9/60
[58] Field of Search ............................ 350/215, 216

[56] References Cited
UNITED STATES PATENTS

| | | | |
|---|---|---|---|
| 2,677,989 | 5/1954 | Tronnier | 350/215 X |
| 2,771,817 | 11/1956 | Aklin | 350/216 X |
| 2,807,983 | 10/1957 | Tronnier | 350/215 |

*Primary Examiner*—John K. Corbin
*Attorney, Agent, or Firm*—Murray Schaffer

[57] ABSTRACT

A reproduction objective formed of five optical components separated by airspaces. The optical component placed next to the image plane is a positive meniscus. The second is a negative meniscus composed of two cemented elements. Both the first and second components represent the front portion of the objective which is separated by a large airspace, in which a mechanical diaphragm is located, from the rear portion of the objective. The rear portion consists of three menisci, the two extreme ones of which have a negative refractivity and the middle one of which has a positive refractivity. The design parameters comply with the following conditions:

(1) $|f_C| > |f_E| > f_D$
(2) $5f_D > |f_C| > 4f_D$
(3) $d_1 > d_6 > d_3$
(4) $m_4 > m_3 \gtreqless m_1$
(5) $R_{10} > R_6 > R_5$
(6) $R_{11} > R_3 > R_7$ where:
$f_A$, $f_B$, $f_C$, $f_D$, $f_E$ are the focal lengths of individual optical components taken from the direction of the image plane, A, B, C, D, E;
$d_1$, $d_3$, $d_6$ are the axial thicknesses of corresponding elements;
$m_1$, $m_3$, $m_4$ are the axial airspaces between corresponding optical components, and
$R_3$, $R_5$, $R_6$, $R_7$, $R_{10}$, $R_{11}$ are the radii of curvature of the corresponding refracting surfaces.

4 Claims, 1 Drawing Figure

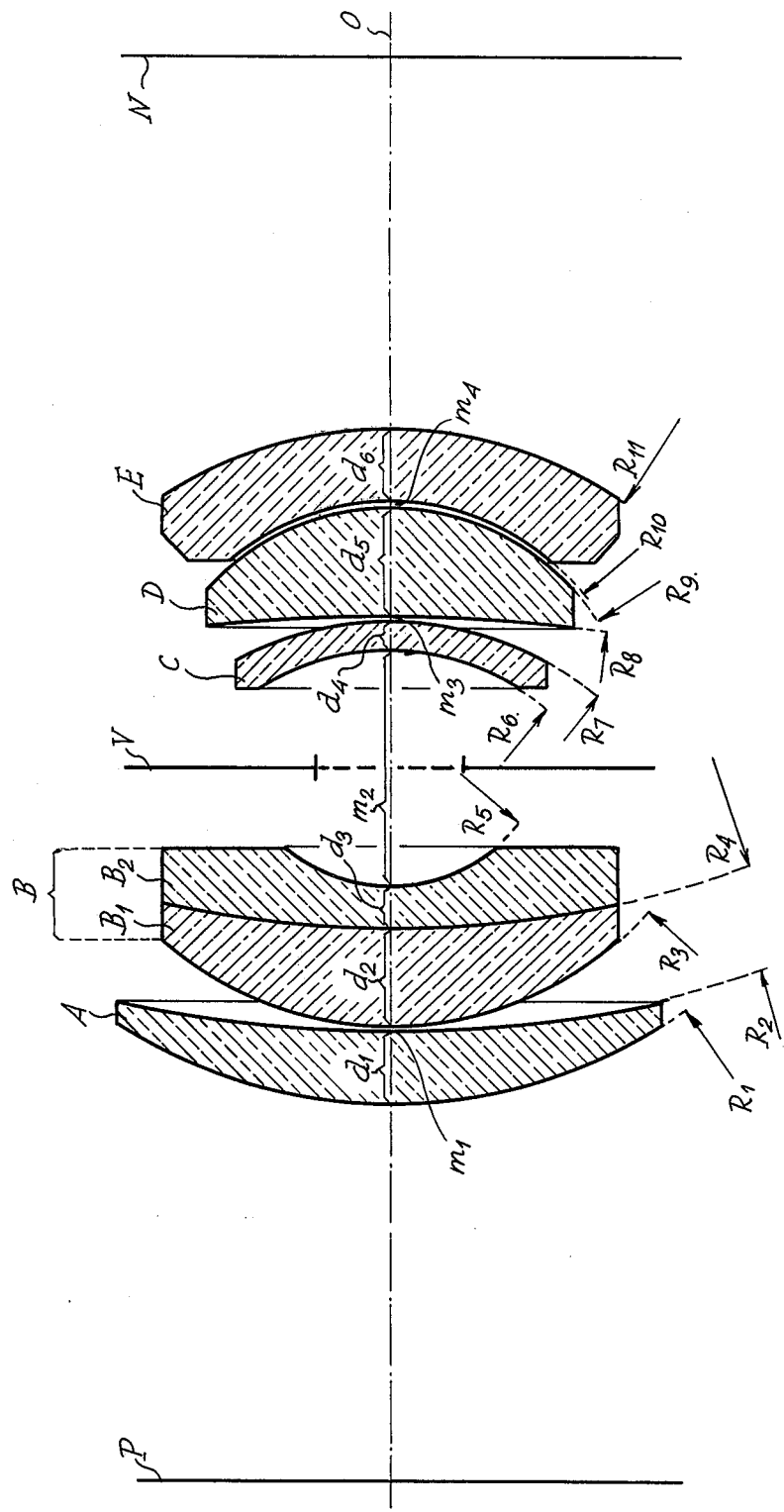

REPRODUCTION LENS SYSTEM

BACKGROUND OF THE INVENTION

The invention relates to an optical lens system and in particular to a reproduction objective for negative enlargement.

It has been known to provide reproduction objectives having various optical lens systems, in which the required image magnification and the optical length of the objective are generally determined by the distance of the conjugated planes of micro-image or negative from the image plane. In these arrangements the state of correction is usually quite sufficient to provide a speed around $f/5.6$ and a field of view of about $42°$. However, the light distribution in the image plane with such systems, in respect to the particular requirements on the given microimage reproduction, is usually unsuitable. Further, geometric vignetting of these objectives is around 40 percent, which is a relatively high value for reproduction purposes. When a more useful light distribution in the image plane is required, objectives of a more complicated optical design, including special optical glasses must be used. This means that the objectives become too expensive.

It is the object of the present invention to provide a reproduction objective that would offer perfect image quality defined by a great resolving power together with a good contrast and contour sharpness rendition and in which the image distortion is practically removed.

It is a further object of the present invention to provide a reproduction objective lens system in which geometric vignetting is reduced to a zero value for a relative aperture $f/4.5$ and in which the objective is of a simple optical design employing ordinary optical glasses.

It is another object of this invention to provide an objective lens system having a magnification range of $7.5x - 30x$ which permits, on the basis of the parameters of the fundamental objective for a predetermined distance of the conjugated planes of microimage from the image plane, the calculation of the parameters of another objective with such a focal length which would correspond to the required image magnification.

These objects and other advantages of the present invention will be seen from the foregoing disclosure of the present invention.

SUMMARY OF THE INVENTION

According to the present invention a lens system for reproduction and enlargement is provided comprising five components, the design parameters of which are chosen in such a manner that the absolute value of the focal length of the fifth component is less than the value of the focal length of the third component but greater than the absolute value of the focal length of the fourth component. The absolute value of the focal length of the third component is at least four to fivefold the value of the fourth component.

Preferably the first optical component, placed next to the image plane, has a form of a positive meniscus. The second optical component adjacent to it has a form of a negative meniscus composed of two cemented elements. Both these components represent the front portion of the objective. The rear portion of the objective consists of three menisci, the two extreme ones of which have a negative refractivity while the middle one of which has a positive refractivity. The space between the front and rear portions, i.e. between the second and third components is quite large and is provided with a mechanical diaphragm or iris.

According to the present invention the axial thickness of the fifth component is greater than the axial thickness of the negative meniscus of the second component, however it is less than the axial thickness of the first component. The airspace between the third and the fourth component is equal or greater than the airspace between the first and the second component, however it is less than the airspace between the fourth and the fifth component. The radius of curvature of the sixth refracting surface is greater than the radius of curvature of the fifth refracting surface, however it is less than the radius of curvature of the tenth refracting surface. The radius of curvature of the third refracting surface is greater than the radius of curvature of the seventh refracting surface, however it is less than the radius of curvature of the eleventh refracting surface.

Full details of the present invention are given in the following description and are illustrated in the accompanying drawings.

BRIEF DESCRIPTION OF DRAWINGS

In the drawing:

The FIGURE is a schematic cross sectional view along the optical axis of a lens system formed according to the present invention.

DESCRIPTION OF INVENTION

As seen in the FIGURE the lens system comprises an arrangement of five separate lenses A, B, C, D and E arranged along an optical axis O. The component A is placed next to the image plane P and has a form of a positive meniscus lens. The second component B is composed of a positive meniscus lens $B_1$ and a negative meniscus $B_2$ which are cemented together in conventional manner. The third component C is a negative meniscus lens while the succeeding fourth component D is a positive meniscus lens. The fifth component E is placed next to the microimage or negative plane N in the form of a negative meniscus lens. A mechanical diaphragm V or iris is placed between the second component B and the third component C. The radii of curvature of the individual refracting surfaces of the respective elements are labelled $R_1$ through $R_{11}$, the axial thicknesses of individual elements are labelled $d_1$ through $d_6$ and the axial airspaces between the respective components are labelled $m_1$ through $m_4$.

The lens components are axially spaced along a common optical axis and may be arranged in a tube or similar housing of conventional design. The mechanical diaphragm may be any one of the conventional and well known type, currently available in this field.

In accordance with the present invention the lenses are arranged and their structure, focal lengths, radii, spacial dimensions and parameters are formed to have the following relationships:

(1) $|f_C| > |f_E| > f_D$
(2) $5 f_D > |f_C| > 4 f_D$
(3) $d_1 > d_6 > d_3$
(4) $m_4 > m_3 \geq m_1$
(5) $R_{10} > R_6 > R_5$
(6) $R_{11} > R_3 > R_7$ where $f_A, f_B, f_C, f_D, f_E$ are the focal lengths of individual optical components A, B, C, D, E; $d_1, d_3, d_6$ are the axial thicknesses of corresponding elements; $m_1, m_3, m_4$ are the axial airspaces between corresponding optical components and $R_3, R_5, R_6, R_7, R_{10}, R_{11}$ are the radii of curvature of corresponding refracting surfaces.

As a result of following the above relationships the objects enumerated in the introduction, namely a distortion free, simple, economical and efficient system for reproduction and enlargement processes over a very wide range of magnification, are obtainable. Uniform light distribution over the whole image format is obtained.

The following I to IV tables give four examples of a $f/4.5$ reproduction objective with design parameters calculated for a focal length $f=100$ mm. Each of the examples are particularly suitable for the degree of magnification given in the example, but are also suitable with a range above and below the given degree of magnification by variance of the given parameters, as indicated later.

Example I:

| B = 7.4 × | | | |
|---|---|---|---|
| $R_1 = + 43.87$ | | $n_d$ | $v$ |
| $R_2 = + 114.88$ | $d_1 = 6.15$ | 1.70154 | 41.1 |
| $R_3 = + 29.93$ | $m_1 = 0.18$ | air | |
| $R_4 = + 92.51$ | $d_2 = 8.45$ | 1.70154 | 41.1 |
| $R_5 = + 19.15$ | $d_3 = 3.40$ | 1.76182 | 26.5 |
| $R_6 = - 20.9$ | $m_2 = 19.25$ | air | |
| $R_7 = - 28.06$ | $d_4 = 2.48$ | 1.57501 | 41.3 |
| $R_8 = - 144.2$ | $m_3 = 0.18$ | air | |
| $R_9 = - 21.29$ | $d_5 = 9.28$ | 1.65844 | 50.8 |
| $R_{10} = - 21.39$ | $m_4 = 0.37$ | air | |
| $R_{11} = - 36.63$ | $d_6 = 5.97$ | 1.62536 | 35.6 |

From the foregoing table it may be calculated that
$f_A = + 97.68$
$f_B = - 107.62$
$f_C = - 163.06$
$f_D = + 36.83$
$f_E = - 96.80$ Example II:

| B = 14.8 × | | | |
|---|---|---|---|
| $R_1 = + 44.355$ | | $n_d$ | $v$ |
| $R_2 = + 113.48$ | $d_1 = 6.84$ | 1.70154 | 41.1 |
| $R_3 = + 29.72$ | $m_1 = 0.33$ | air | |
| $R_4 = + 97.06$ | $d_2 = 8.15$ | 1.70154 | 41.1 |
| $R_5 = + 19.28$ | $d_3 = 3.42$ | 1.76182 | 26.5 |
| $R_6 = - 20.75$ | $m_2 = 19.22$ | air | |
| $R_7 = - 28.12$ | $d_4 = 2.61$ | 1.57501 | 41.3 |
| $R_8 = - 167.85$ | $m_3 = 0.33$ | air | |
| $R_9 = - 22.03$ | $d_5 = 9.12$ | 1.65844 | 50.8 |
| $R_{10} = - 22.13$ | $m_4 = 0.65$ | air | |
| $R_{11} = - 37.41$ | $d_6 = 5.54$ | 1.62536 | 35.6 | whereby
$f_A = + 99.73$
$f_B = - 110.65$
$f_C = - 158.13$
$f_D = + 37.58$
$f_E = - 100.68$ Example III:

| B = 21 × | | | |
|---|---|---|---|
| $R_1 = + 45.3$ | | $n_d$ | $v$ |
| $R_2 = + 110.7$ | $d_1 = 7.9$ | 1.70154 | 41.1 |
| $R_3 = + 29.25$ | $m_1 = 0.22$ | air | |
| $R_4 = + 91.24$ | $d_2 = 8.33$ | 1.70154 | 41.1 |
| $R_5 = + 18.97$ | $d_3 = 3.51$ | 1.76182 | 26.5 |
| $R_6 = - 20.43$ | $m_2 = 19.08$ | air | |
| $R_7 = - 27.68$ | $d_4 = 2.41$ | 1.57501 | 41.3 |
| $R_8 = - 169.08$ | $m_3 = 0.22$ | air | |
| $R_9 = - 21.05$ | $d_5 = 9.43$ | 1.65844 | 50.8 |
| $R_{10} = - 21.19$ | $m_4 = 0.44$ | air | |
| $R_{11} = - 36.48$ | $d_6 = 4.61$ | 1.62536 | 35.6 | whereby
$f_A = + 104.11$
$f_B = - 112.22$
$f_C = - 154.39$
$f_D = + 35.61$
$f_E = - 91.45$ Example IV:

| B = 29.7 × | | | |
|---|---|---|---|
| $R_1 = + 44.55$ | | $n_d$ | $v$ |
| $R_2 = + 113.99$ | $d_1 = 7.99$ | 1.70154 | 41.1 |
| $R_3 = + 29.96$ | $m_1 = 0.61$ | air | |
| $R_4 = + 97.91$ | $d_2 = 8.18$ | 1.70154 | 41.1 |
| $R_5 = + 18.92$ | $d_3 = 3.44$ | 1.76182 | 26.5 |
| $R_6 = - 20.94$ | $m_2 = 19.25$ | air | |
| $R_7 = - 28.12$ | $d_4 = 2.58$ | 1.57501 | 41.3 |
| $R_8 = - 168.63$ | $m_3 = 0.61$ | air | |
| $R_9 = - 21.94$ | $d_5 = 9.84$ | 1.65844 | 50.8 |
| $R_{10} = - 21.94$ | $m_4 = 0.68$ | air | |
| $R_{11} = - 36.21$ | $d_6 = 5.53$ | 1.62536 | 35.6 | whereby:
$f_A = + 99.52$
$f_B = - 101.15$
$f_C = - 164.16$
$f_D = + 37.31$
$f_E = - 104.62$ In the foregoing examples the conventional measurements are in millimeters.

The radii of curvature $R_1, R_2, R_3, R_5, R_6, R_7, R_8$ may be changed within $\pm 10$ percent, $R_4, R_{11}$ within $\pm 20$ percent and $R_9, R_{10}$ within $\pm 5$ percent. The axial thicknesses $d_1$ and $d_6$ may be changed within $\pm 20$ percent and $d_2, d_3, d_4, d_5$ within $\pm 100$ percent. The airspaces $m_1, m_3, m_4$ may be changed within $\pm 30$ percent and $m_2$ within $\pm 10$ percent. The refracting indices $n_{d_1}, n_{d_2}, n_{d_3}, n_{d_4}$ may be changed within $\pm 20$ percent and $n_{d_5}$ and $n_{d_6}$ within $\pm 10$ percent.

In the foregoing examples $R_1 - R_{11}$ are the radii of curvature of the individual refracting surfaces, $d_1 - d_6$ are the axial thicknesses of the individual components, $m_1$ through $m_4$ are the thicknesses of the airspaces between the individual components, $n_d$ is the refracting index for the D-line of the spectrum and $v$ is the Abbe number. The measurements are all taken in millimeters.

Due to the advantageous state of correction and the practical total removal of all vignetting and image distortion, the above described optical system of a reproduction objective exemplified in the four examples and varied within the defined ranges is suitable for advanced reproduction and enlargement particularly in the image magnification range of anywhere between 7 × to 30 ×.

Modification of the Examples by the variances indicated above will produce lens objectives having the distinct advantages and benefits enumerated earlier. Such systems as noted adaptable to speeds as high as $f/4.5$ within the broad magnification range of 7× – 30× with very little vignetting or distortion. In view of this the present disclosure is illustrative only of the invention and may be modified as desired within the scope of the claims.

What is claimed is:

1. An objective lens system comprising five optical components separated by airspaces wherein the first optical component, placed next to the image plane, is a positive meniscus, the second optical component adjacent to it is a negative meniscus composed of two cemented elements, both said first and second components representing the front portion of the objective, the third, fourth and fifth components comprise the rear portion of the objective and consist of three menisci the two extreme ones having a negative refractivity, the middle one having a positive refractivity, said front and rear portions being separated by a large space in which a mechanical diaphragm is located, and wherein the design parameters conform substantially to:

| | | $n_d$ | $v$ |
|---|---|---|---|
| $R_1 = + 43.87$ | | | |
| $R_2 = + 114.88$ | $d_1 = 6.15$ | 1.70154 | 41.1 |
| $R_3 = + 29.93$ | $m_1 = 0.18$ | air | |
| $R_4 = + 92.51$ | $d_2 = 8.45$ | 1.70154 | 41.1 |
| $R_5 = + 19.15$ | $d_3 = 3.40$ | 1.76182 | 26.5 |
| $R_6 = - 20.9$ | $m_2 = 19.25$ | air | |
| $R_7 = - 28.06$ | $d_4 = 2.48$ | 1.57501 | 41.3 |
| $R_8 = - 144.2$ | $m_3 = 0.18$ | air | |
| $R_9 = - 21.29$ | $d_5 = 9.28$ | 1.65844 | 50.8 |
| $R_{10} = - 21.39$ | $m_4 = 0.37$ | air | |
| $R_{11} = - 36.63$ | $d_6 = 5.97$ | 1.62536 | 35.6 | wherein $f_A = + 97.68$
$f_B = - 107.62$
$f_C = - 163.06$
$f_D = + 36.83$
$f_E = - 96.80$ where
$R_1 - R_{11}$ are the radii of curvature of individual refracting surfaces;
$d_1 - d_6$ are the axial thicknesses of individual elements;
$m_1 - m_4$ are axial airspaces between individual optical components;
$n_d$ is the refractive index for the spectral D-line;
$v$ is the Abbe number
and
$f_A, f_B, f_C, f_D, f_E$ are the focal lengths of individual optical components.

2. An objective lens system comprising five optical components separated by airspaces wherein the first optical component, placed next to the image plane, is a positive meniscus, the second optical component adjacent to it is a negative meniscus composed of two cemented elements, both said first and second components representing the front portion of the objective, the third, fourth and fifth components comprise the rear portion of the objective and consist of three menisci the two extreme ones having a negative refractivity, the middle one having a positive refractivity, said front and rear portions being separated by a large space in which a mechanical diaphragm is located, and wherein the design parameters conform substantially to:

| | | $n_d$ | $v$ |
|---|---|---|---|
| $R_1 = + 44.355$ | | | |
| $R_2 = + 113.48$ | $d_1 = 6.84$ | 1.70154 | 41.1 |
| $R_3 = + 29.72$ | $m_1 = 0.33$ | air | |
| $R_4 = + 97.06$ | $d_2 = 8.15$ | 1.70154 | 41.1 |
| $R_5 = + 19.28$ | $d_3 = 3.42$ | 1.76182 | 26.5 |
| $R_6 = - 20.75$ | $m_2 = 19.22$ | air | |
| $R_7 = - 28.12$ | $d_4 = 2.61$ | 1.57501 | 41.3 |
| $R_8 = - 167.85$ | $m_3 = 0.33$ | air | |
| $R_9 = - 22.03$ | $d_5 = 9.12$ | 1.65844 | 50.8 |
| $R_{10} = - 22.13$ | $m_4 = 0.65$ | air | |
| $R_{11} = - 37.41$ | $d_6 = 5.54$ | 1.62536 | 35.6 | where $f_A = + 99.73$
$f_B = - 110.65$
$f_C = - 158.13$
$f_D = + 37.58$
$f_E = - 100.68$ where
$R_1 - R_{11}$ are the radii of curvature of individual refracting surfaces;
$d_1 - d_6$ are the axial thicknesses of individual elements;
$m_1 - m_4$ are the axial airspaces between individual optical components;
$n_d$ is the refractive index for the spectral D-line;
$v$ is the Abbe number
and
$f_A, f_B, f_C, f_D, f_E$ are the focal lengths of individual components.

3. An objective lens system comprising five optical components separated by airspaces wherein the first optical component, placed next to the image plane, is a positive meniscus, the second optical component adjacent to it is a negative meniscus composed of two cemented elements, both said first and second components representing the front portion of the objective, the third, fourth and fifth components comprise the rear portion of the objective and consist of three menisci the two extreme ones having a negative refractivity, the middle one having a positive refractivity, said front and rear portions being separated by a large space in which a mechanical diaphragm is located, and wherein the design parameters conform substantially to:

| | | $n_d$ | $v$ |
|---|---|---|---|
| $R_1 = + 45.3$ | | | |
| $R_2 = + 110.7$ | $d_1 = 7.9$ | 1.70154 | 41.1 |
| $R_3 = + 29.25$ | $m_1 = 0.22$ | air | |
| $R_4 = + 91.24$ | $d_2 = 8.33$ | 1.70154 | 41.1 |
| $R_5 = + 18.97$ | $d_3 = 3.51$ | 1.76182 | 26.5 |
| $R_6 = - 20.43$ | $m_2 = 19.08$ | air | |
| $R_7 = - 27.68$ | $d_4 = 2.41$ | 1.57501 | 41.3 |
| $R_8 = - 169.08$ | $m_3 = 0.22$ | air | |
| $R_9 = - 21.05$ | $d_5 = 9.43$ | 1.65844 | 50.8 |
| $R_{10} = - 21.19$ | $m_4 = 0.44$ | air | |
| $R_{11} = - 36.48$ | $d_6 = 4.61$ | 1.62536 | 35.6 | where $f_A = + 104.11$
$f_B = - 112.22$
$f_C = - 154.39$
$f_D = + 35.61$
$f_E = - 91.45$ where
$R_1 - R_{11}$ are the radii of curvature of individual refracting surfaces;
$d_1 - d_6$ are the axial thicknesses of individual elements;
$m_1 - m_4$ are the axial airspaces between individual optical components;

$n_d$ is the refractive index for the spectral D-line;
$\nu$ is the Abbe number
and
$f_A, f_B, f_C, f_D, f_E$ are the focal lengths of individual optical components.

4. An objective lens system comprising five optical components separated by airspaces wherein the first optical component, placed next to the image plane, is a positive meniscus, the second optical component adjacent to it is a negative meniscus composed of two cemented elements, both said first and second components representing the front portion of the objective, the third, fourth and fifth components comprise the rear portion of the objective and consist of three menisci the two extreme ones having a negative refractivity, the middle one having a positive refractivity, said front and rear portions being separated by a large space in which a mechanical diaphragm is located, and wherein the design parameters conform substantially to:

| | | $n_d$ | $\nu$ |
|---|---|---|---|
| $R_1 = + 44.55$ | | | |
| $R_2 = + 113.99$ | $d_1 = 7.99$ | 1.70154 | 41.1 |
| $R_3 = + 29.96$ | $m_1 = 0.61$ | air | |
| $R_4 = + 97.91$ | $d_2 = 8.18$ | 1.70154 | 41.1 |
| $R_5 = + 18.92$ | $d_3 = 3.44$ | 1.76182 | 26.5 |
| $R_6 = - 20.94$ | $m_2 = 19.25$ | air | |
| $R_7 = - 28.12$ | $d_4 = 2.58$ | 1.57501 | 41.3 |
| $R_8 = - 168.63$ | $m_3 = 0.61$ | air | |
| $R_9 = - 21.94$ | $d_5 = 9.84$ | 1.65844 | 50.8 |
| $R_{10} = - 21.94$ | $m_4 = 0.68$ | air | |
| $R_{11} = - 36.21$ | $d_6 = 5.53$ | 1.62536 | 35.6 | where
$f_A = + 99.52$
$f_B = - 101.15$
$f_C = - 164.16$
$f_D = + 37.31$
$f_E = - 104.62$
where
$R_1 - R_{11}$ are the radii of curvature of individual refracting surfaces;
$d_1 - d_6$ are the axial thicknesses of individual elements;
$m_1 - m_4$ are the axial airspaces between individual optical components;
$n_d$ is the refractive index for the spectral D-line;
$\nu$ is the Abbe number
and
$f_A, f_B, f_C, f_D, f_E$ are the focal lengths of individual optical components.

* * * * *